(12) United States Patent
Duc et al.

(10) Patent No.: US 12,041,963 B2
(45) Date of Patent: Jul. 23, 2024

(54) AEROSOL GENERATING ARTICLE WITH NON-COMBUSTIBLE COATING

(71) Applicant: PHILIP MORRIS PRODUCTS S.A., Neuchatel (CH)

(72) Inventors: Fabien Duc, Carouge (CH); Urs Gonzenbach, Buchs (CH); Johannes Petrus Maria Pijnenburg, Neuchatel (CH); Chiara Spadaro, Olten (CH); Philip Sturzenegger, Greifensee (CH)

(73) Assignee: Philip Morris Products S.A., Neuchatel (CH)

( * ) Notice: Subject to any disclaimer, the term of this patent is extended or adjusted under 35 U.S.C. 154(b) by 280 days.

(21) Appl. No.: 17/768,652

(22) PCT Filed: Oct. 13, 2020

(86) PCT No.: PCT/EP2020/078741
§ 371 (c)(1),
(2) Date: Apr. 13, 2022

(87) PCT Pub. No.: WO2021/074127
PCT Pub. Date: Apr. 22, 2021

(65) Prior Publication Data
US 2023/0097210 A1 Mar. 30, 2023

(30) Foreign Application Priority Data
Oct. 14, 2019 (EP) ..................................... 19203081

(51) Int. Cl.
*A24D 1/22* (2020.01)
*A24B 15/16* (2020.01)
(Continued)

(52) U.S. Cl.
CPC .............. *A24D 1/22* (2020.01); *A24B 15/165* (2013.01); *A24D 1/025* (2013.01); *C09D 1/04* (2013.01);
(Continued)

(58) Field of Classification Search
None
See application file for complete search history.

(56) References Cited

U.S. PATENT DOCUMENTS

2015/0007837 A1* 1/2015 Roudier ................... A24D 1/22
428/218

FOREIGN PATENT DOCUMENTS

| EP | 0174645 | 3/1986 |
| EP | 2070682 | 6/2009 |

(Continued)

OTHER PUBLICATIONS

PCT Search Report and Written Opinion for Application No. PCT/EP2020/078741 dated Nov. 20, 2020 (10 pages).
(Continued)

*Primary Examiner* — Philip Y Louie
*Assistant Examiner* — Eric M Fierce
(74) *Attorney, Agent, or Firm* — Mueting Raasch Group

(57) ABSTRACT

There is provided an aerosol generating article (2) comprising a combustible heat source (4) having an upstream portion and a downstream portion. The aerosol generating article further comprises an aerosol-forming substrate (10) downstream of the heat source (4) and a wrapper (36) circumscribing an upstream portion of the aerosol-forming substrate (10) and the downstream portion of the combustible heat source (4). The aerosol generating article (2) further comprises a non-combustible coating (42) provided on the upstream portion of the combustible heat source (4) and not on the downstream portion of the combustible heat (Continued)

source (4), the non-combustible coating having a thickness of between about 30 micrometres and about 250 micrometres.

15 Claims, 4 Drawing Sheets

(51) Int. Cl.
*A24D 1/02* (2006.01)
*C09D 1/04* (2006.01)
*C09D 5/18* (2006.01)
*C09D 7/40* (2018.01)
*C09D 7/61* (2018.01)

(52) U.S. Cl.
CPC .................. *C09D 5/18* (2013.01); *C09D 7/61* (2018.01); *C09D 7/67* (2018.01); *C09D 7/68* (2018.01); *C09D 7/69* (2018.01)

(56) References Cited

FOREIGN PATENT DOCUMENTS

| | | |
|---|---|---|
| JP | 2005295979 | 10/2005 |
| WO | WO 2009/022232 | 2/2009 |
| WO | WO 2013/072336 | 5/2013 |
| WO | WO 2013/120855 | 8/2013 |
| WO | WO 2014/037270 | 3/2014 |
| WO | WO 2014/096317 | 6/2014 |
| WO | WO 2017/207672 | 12/2017 |
| WO | WO 2017/207673 | 12/2017 |
| WO | WO 2018/220082 | 12/2018 |
| WO | WO 2019/219869 | 11/2019 |

OTHER PUBLICATIONS

Communication issued in Europe for Application No. 19203081.5 dated Apr. 23, 2020 (8 pages).

* cited by examiner

AEROSOL GENERATING ARTICLE WITH NON-COMBUSTIBLE COATING

This application is a U.S. National Stage Application of International Application No. PCT/EP2020/078741 filed Oct. 13, 2020, which was published in English on Apr. 22, 2021, as International Publication No. WO 2021/074127 A1. International Application No. PCT/EP2020/078741 claims priority to European Application No. 19203081.5 filed Oct. 14, 2019.

The present invention relates to an aerosol generating article comprising a non-combustible coating provided on a combustible heat source.

A number of smoking articles in which tobacco is heated rather than combusted have been proposed in the art. In one known type of heated smoking article, an aerosol is generated by the transfer of heat from a combustible heat source to an aerosol-forming substrate located downstream of the combustible heat source. During smoking, volatile compounds are released from the aerosol-forming substrate by heat transfer from the combustible heat source and entrained in air drawn through the smoking article. As the released compounds cool, they condense to form an aerosol.

A variety of combustible carbon-containing heat sources for use in heated smoking articles have been proposed in the art. The combustion temperature of combustible carbon-containing heat sources for use in heated smoking articles is typically between about 600° C. and 800° C. Heated smoking articles comprising combustible carbon-containing heat sources can have an undesirably high ignition propensity due to the high combustion temperature of combustible carbon-containing heat sources.

It is known to wrap an insulating member around the periphery of a combustible carbon-containing heat source of a heated smoking article in order to reduce the ignition propensity of the combustible heat source. Inclusion of an insulating member circumscribing the combustible carbon-containing heat source of a heated smoking article reduces the ignition propensity of the combustible heat source by reducing the surface temperature of the aerosol generating article.

In some aerosol generating articles of the prior art, the combustible heat source is formed integrally with an insulating layer, for example using a die pressing process or a co-extrusion process. However, while such insulating layers may reduce the ignition propensity or the combustible heat source, these integrally formed layers may also make the combustible heat source difficult to ignite using a conventional yellow flame lighter.

It may be desirable to provide an insulated heat source for a smoking article that has a reduced ignition propensity, but which also is readily ignited by a yellow flame lighter.

Furthermore, it is known to add ignition aids to combustible heat sources of aerosol generating articles of the prior art. However, sometimes the ignition aid is not fully consumed during ignition or at the start of the combustion of the heat source. It has been found that where this occurs, and the ignition aid is consumed later during the combustion of the heat source, a build-up of gasses can occur in the heat source. This may be known as the late boost phenomenon. The internal pressure caused by the build-up of combustion gases may damage the heat source or, in some cases, lead to the heat source becoming detached from the rest of the smoking article.

It may further be desirable to provide a combustible heat source which does not experience the technical problems associated with the late boost phenomenon.

According to a first aspect of the present invention, there is provided an aerosol generating article comprising a combustible heat source. The combustible heat source has an upstream portion and a downstream portion.

The aerosol generating article may further comprise an aerosol-forming substrate downstream of the combustible heat source. The heat from the combustible heat source may cause volatile compounds from the aerosol-forming substrate to be released as an aerosol.

The aerosol generating article may further comprise a wrapper circumscribing an upstream portion of the aerosol-forming substrate and the downstream portion of the combustible heat source.

The provision of a wrapper may advantageously secure the combustible heat source to the aerosol-forming substrate. This may be particularly important where the late boost phenomenon exerts pressure on the heat source since the wrapper may keep the heat source securely attached to the aerosol-forming substrate.

A non-combustible coating may be provided on the upstream portion of the combustible heat source and not on the downstream portion of the combustible heat source.

The non-combustible coating may advantageously reduce the ignition propensity of the combustible heat source by insulating the heat source from other materials with which the heat source may come into contact.

The non-combustible coating may have a thickness of between about 30 micrometres and about 250 micrometres.

As will be explained in more detail below, it has been found that a coating with a thickness in this range advantageously reduces the ignition propensity of the combustible heat source, while also still allowing the heat source to be ignited using a conventional yellow flame lighter. Furthermore, it has surprisingly been found that the provision of a non-combustible coating having a thickness of between about 30 micrometres and about 250 micrometres may reduce the likelihood of the occurrence of the late boost phenomenon, which may advantageously reduce the likelihood of damage to the combustible heat source during use of the aerosol generating article.

According to a first aspect of the present invention, preferably there is provided an aerosol generating article comprising a combustible heat source. The combustible heat source has an upstream portion and a downstream portion. The aerosol generating article further comprises a wrapper circumscribing an upstream portion of the aerosol-forming substrate and the downstream portion of the combustible heat source. The aerosol generating article further comprises a non-combustible coating provided on the upstream portion of the combustible heat source and not on the downstream portion of the combustible heat source, the non-combustible coating having a thickness of between about 30 micrometres and about 250 micrometres.

The provision of an aerosol generating article according to the present invention overcomes many of the shortcomings of aerosol generating articles of the prior art. In particular, the provision of the non-combustible coating having a thickness of between about 30 micrometres and about 250 micrometres may advantageously reduce the ignition propensity of the combustible heat source, while still allowing the heat source to be ignited using a conventional yellow flame lighter. Furthermore, it has been found that the non-combustible coating may advantageously reduce the likelihood of the occurrence of the late boost phenomenon, which may advantageously reduce the likelihood of damage to the combustible heat source during use of the aerosol generating article. Without wishing to be bound by theory, this may be because the provision of a non-combustible coating may lead to slower or more gradual heating of the heat source. This may mean that the combustible heat source changes temperature more evenly which may facilitate better consumption of any ignition aid at the start of the combustion process. Furthermore, more gradual and even heating may result in smaller temperature gradients across the length of the combustible heat source which may further give gasses resulting from combustion more time to escape the combustible heat source which may further reduce the likelihood of damage to the combustible heat source.

The provision of the non-combustible coating on the upstream portion of the combustible heat source, and the wrapper circumscribing only the downstream portion of the heat source allows the wrapper to be in direct contact with the combustible heat source where the wrapper circumscribes the combustible heat source. This may advantageously further improve the retention of the combustible heat source to the aerosol-forming substrate.

The combustible heat source has an upstream portion and a downstream portion. The upstream portion is located towards the upstream end of the combustible heat source and is defined as the portion of the surface of the combustible heat source which includes the non-combustible coating. The downstream portion of the combustible heat source is located towards the downstream end of the combustible heat source and is defined as the portion of the combustible heat source circumscribed by the wrapper. In other words, the surface of the combustible heat source comprises an upstream portion, on which is provided the non-combustible coating, and a downstream portion, which is circumscribed by the wrapper. The upstream portion and the downstream portion of the combustible heat source may be different lengths.

The upstream portion of the combustible heat source may be longer than the downstream portion of the combustible heat source. This may ensure that a greater portion of the combustible heat source is exposed and is not covered by the wrapper. This may advantageously facilitate ignition and sustained combustion of the combustible heat source.

The upstream portion of the combustible heat source may abut the downstream portion of the combustible heat source such that there is no gap between the downstream end of the non-combustible coating and the upstream end of the wrapper. This may advantageously ensure that none of the combustible heat source is exposed, further reducing the ignition propensity of the combustible heat source.

The upstream portion of the combustible heat source may not abut the downstream portion of the combustible heat source such that there is a gap between the downstream end of the non-combustible coating and the upstream end of the wrapper. This may advantageously allow air to reach the combustible heat source to facilitate ignition and sustained combustion.

The combustible heat source may have a longitudinal outer surface. The non-combustible coating provided on the upstream portion of the combustible heat source and not the downstream portion of the combustible heat source may be provided on the longitudinal outer surface of the upstream portion of the combustible heat source.

As used herein with reference to the invention, the terms "longitudinal" and "axial" are used to describe the direction between the opposed upstream and downstream ends of the aerosol generating article, or of a component of the aerosol generating article. The "longitudinal outer surface" is therefore the outer surface of a component of the aerosol generating article which extends between opposed upstream and downstream ends of the component of the aerosol generating article.

As used herein with reference to the invention, the terms "abutting" and "abut" are used to describe a component, or a portion of a component, being in direct contact with another component, or portion of a component.

As used herein with reference to the invention, the terms "circumscribe" and "circumscribing" refer to a first feature extending around the entire circumference of a second feature. For example, in the present invention the wrapper circumscribes an upstream portion of the aerosol-forming substrate and the downstream portion of the combustible heat source. This means that at one or more points along the longitudinal length of the upstream portion of the aerosol-forming substrate, the wrapper extends around the entire circumference of the aerosol-forming substrate, and that at one or more points along the longitudinal length of the downstream portion of the combustible heat source, the wrapper extends around the entire circumference of the combustible heat source.

As used herein with reference to the invention, the terms "upstream" and "front", and "downstream" and "rear", are used to describe the relative positions of components, or portions of components, of the aerosol generating article in relation to the direction in which airflows through the aerosol generating article during use thereof. Aerosol generating articles according to the invention comprise a proximal end through which, in use, an aerosol exits the article. The proximal end of the aerosol generating article may also be referred to as the mouth end or the downstream end. The mouth end is downstream of the distal end. The combustible heat source is located at or proximate to the distal end. The distal end of the aerosol generating article may also be referred to as the upstream end. Components, or portions of components, of the aerosol generating article may be described as being upstream or downstream of one another based on their relative positions between the proximal end of the smoking article and the distal end of the aerosol generating article. The front of a component, or portion of a component, of the aerosol generating article is the portion at the end closest to the upstream end of the aerosol generating article. The rear of a component, or portion of a component, of the aerosol generating article is the portion at the end closest to the downstream end of the aerosol generating article. The rear portion of the combustible heat source is the portion of the combustible heat source at the downstream end of the combustible heat source. The front portion of the aerosol-forming substrate is the portion of the aerosol-forming substrate at the upstream end of the aerosol-forming substrate.

As used herein with reference to the invention, the term "coating" is used to describe a layer of material that covers and is adhered to the heat source.

As used herein with reference to the invention, the term "non-combustible" is used to describe a coating that is substantially non-combustible at temperatures reached by the combustible heat source during combustion or ignition thereof.

The provision of a non-combustible coating, rather than another type of non-combustible barrier is advantageous since it allows the non-combustible barrier to be particularly thin. This may advantageously allow the combustible heat source to be readily ignitable using a yellow flame lighter.

The coating may be applied to the combustible heat source by any means. For example, the coating may be applied to the combustible heat source by applying a liquid pre-coating formulation comprising a non-combustible material to the combustible heat source. The applied pre-coating formulation may then undergo at least one of a drying and a curing process to form the non-combustible coating. The liquid pre-coating formulation may be applied using at least one of dipping or spraying.

The combustible heat source may comprise at least one ignition aid.

As used herein, the term "ignition aid" is used to denote a material that releases one or both of energy and oxygen during ignition of the combustible heat source, where the rate of release of one or both of energy and oxygen by the material is not ambient oxygen diffusion limited. In other words, the rate of release of one or both of energy and oxygen by the material during ignition of the combustible heat source is largely independent of the rate at which ambient oxygen can reach the material. As used herein, the term "ignition aid" is also used to denote an elemental metal that releases energy during ignition of the combustible heat source, wherein the ignition temperature of the elemental metal is below about 500 degrees Celsius and the heat of combustion of the elemental metal is at least about 5 kJ/g.

As used herein, the term "ignition aid" does not include alkali metal salts of carboxylic acids (such as alkali metal citrate salts, alkali metal acetate salts and alkali metal succinate salts), alkali metal halide salts (such as alkali metal chloride salts), alkali metal carbonate salts or alkali metal phosphate salts, which are believed to modify carbon combustion. Even when present in a large amount relative to the total weight of the combustible heat source, such alkali metal burn salts do not release enough energy during ignition of a combustible heat source to produce an acceptable aerosol during early puffs.

Examples of suitable ignition aids include, but are not limited to: nitrates; chlorates; perchlorates; bromates; bromites; borates; ferrates; ferrites; manganates; permanganates; organic peroxides; inorganic peroxides; superoxides; carbonates; iodates; periodates; iodites; sulphates; sulfites; other sulfoxides; phosphates; phospinates; phosphites; and phosphanites. The at least one ignition aid may comprise calcium peroxide.

In use, the release of one or both of energy and oxygen by the at least one ignition aid during ignition of the combustible heat source results in a boost in temperature of the combustible heat source upon ignition thereof. This is reflected in an increase in temperature of the heat source. This may advantageously ensure that sufficient heat is available to be transferred from the heat source to the aerosol-forming substrate.

Furthermore, as set out above, the provision of a non-combustible coating according to the present invention may be particularly advantageous where the combustible heat source comprises an ignition aid since the non-combustible coating may help prevent the late boost phenomenon which may advantageously reduce the likelihood of damage to the heat source.

The non-combustible coating may not be provided on the front end face of the combustible heat source.

The combustible heat source may be substantially cylindrical in shape having a longitudinal surface on which the non-combustible coating and a portion of the wrapper is provided. The combustible heat source may also include front and rear end faces between the longitudinal surfaces.

By not providing the non-combustible coating on the front end face of the combustible heat source, the front end face of the combustible heat source remains exposed. This may advantageously allow sufficient air to reach the combustible heat source to facilitate ignition and sustained combustion of the combustible heat source. The inventors of the present invention have realised that, to reduce the ignition propensity of the combustible heat source, it is not essential that the non-combustible coating is provided on the front end face. This is because if the aerosol generating article is put down on a surface, it is unlikely that the front end face will be in contact with the surface.

The non-combustible coating has a thickness of between about 30 micrometres and about 250 micrometres. As set out above, it has been found that a non-combustible coating having a thickness within this range may advantageously reduce the ignition propensity of the combustible heat source while still allowing the combustible heat source to be readily ignited with a yellow flame lighter.

The non-combustible coating may have a thickness of at least about 30 micrometres, at least about 50 micrometres, or at least about 75 micrometres.

The non-combustible coating may have a thickness of no more than about 250 micrometres, no more than about 200 micrometres, or no more than bout 150 micrometres.

For example, the non-combustible coating may have a thickness of between about 50 micrometres and about 200 micrometres, or between about 75 micrometres and about 150 micrometres. The non-combustible coating may have a thickness of about 150 micrometres.

The non-combustible coating may comprise any non-combustible material. The non-combustible coating may be a thermally insulating coating. Where this is the case, the non-combustible coating may comprise a thermally insulating material.

As used herein with reference to the invention, the term "thermally insulating material" is used to describe material having a bulk thermal conductivity of less than about 50 milliwatts per metre Kelvin (mW/(m·K)) at 23° C. and a relative humidity of 50% as measured using the modified transient plane source (MTPS) method.

Preferably, the non-combustible coating comprises thermally insulating material having a bulk thermal diffusivity of less than or equal to about 0.01 square centimetres per second (cm2/s) as measured using the laser flash method.

Preferably, in use in aerosol generating articles according to the invention, the outer surface of the non-combustible coating should not exceed about 350° C.

The non-combustible coating may be porous. The non-combustible coating may contain pores. This may advantageously allow sufficient oxygen to reach the combustible heat source to sustain combustion thereof.

The non-combustible coating may comprise ceramic particles.

The use of ceramic particles in the non-combustible coating is advantageous since ceramic can be non-combustible and thermally insulating. The use of particles also advantageously allows the non-combustible coating to remain porous so that air is able to reach the combustible heat source.

The ceramic particles may have any size. The ceramic particles may have a mean particle size of at least about 0.02 micrometres, or at least about 0.04 micrometres. The ceramic particles may have a mean particle size of no more than about 250 micrometres, no more than about 150 micrometres, or no more than about 100 micrometres.

The ceramic particle may have a mean particle size of between about 0.02 micrometres and about 250 micrometres, between about 0.04 micrometres and about 150 micrometres, or between about 0.04 and about 100 micrometres.

The ceramic particles may comprise at least one of diatomaceous earth, expanded clay, vermiculite, pearlite, foam glass, kaolinite, and zirconia.

The non-combustible coating may comprise any amount of ceramic particles. For example, the non-combustible coating may comprise at least about 60 weight percent ceramic particles, at least about 70 weight percent ceramic particles, or at least about 80 weight percent ceramic particles.

The non-combustible coating may comprise no more than about 95 weight percent ceramic particles, no more than about 90 weight percent ceramic particles, or no more than about 86 weight percent ceramic particulate.

For example, the non-combustible coating may comprise between about 60 weight percent and about 95 weight percent ceramic particles, between about 70 weight percent and about 90 weight percent ceramic particles, or between about 80 weight percent and about 86 weight percent ceramic particles. The non-combustible coating may comprise about 85 weight percent ceramic particles.

These ceramic materials may advantageously be particularly effective at reducing the ignition propensity of the combustible heat source while at the same time allowing the combustible heat source to be ignited using a yellow flame lighter. These ceramic materials may also advantageously effectively reduce the likelihood of the late boost phenomenon being observed.

Preferably, the ceramic particles comprises diatomaceous earth and kaolinite.

The non-combustible coating may comprise a rheology modifier.

The provision of a rheology modifier may advantageously control the rheology of the pre-coating formulation to enable the pre-formulation to be readily applied to the combustible heat source, for example by dipping or spraying.

As used herein with reference to the invention, the term "rheology modifier" refers to an additive which alters the flow properties of the pre-coating formulation. For example, the rheology modifier may modify the viscosity of the pre-coating formulation. The rheology modifier may increase the viscosity of the pre-coating formulation. The rheology modifier may decrease the viscosity of the pre-coating formulation.

It will be appreciated that the desired flow properties of the pre-coating formulation may vary depending on how the pre-coating formulation is to be applied to the combustible heat source. Accordingly, the type and quantity of rheology modifier may be carefully selected depending on the intended application method. Following any drying or curing steps, the rheology modifier remains in the non-combustible coating. The rheology modifier preferably has little influence, or no influence, on the thermal or structural properties of the non-combustible coating.

The rheology modifier may be any rheology modifier. The rheology modifier may comprise at least one of cellulose, cellulose derivatives, polyvinyl alcohol, polyethylene imine, polyethylene oxide, polyethylene glycol, xanthan gum, bentonite, microsilica, calcium carbonate, sodium silicate, and potassium silicates.

These rheology modifiers may advantageously be particularly effective at providing appropriate rheology properties for the pre-coating formulation.

The non-combustible coating may comprise any amount of rheology modifier. For example, the non-combustible coating may comprise at least about 3 weight percent rheology modifier, at least about 5 weight percent rheology modifier, or at least about 10 weight percent rheology modifier.

The non-combustible coating may comprise no more than about 30 weight percent rheology modifier, no more than about 25 weight percent rheology modifier, or no more than about 20 weight percent rheology modifier.

For example, the non-combustible coating may comprise between about 3 weight percent and about 30 weight percent rheology modifier, between about 5 weight percent and about 25 weight percent rheology modifier, or between about 10 weight percent and about 20 weight percent rheology modifier. The non-combustible coating may comprise about 15 weight percent rheology modifier.

In certain preferred embodiments, the non-combustible coating may comprise diatomaceous earth, kaolinite, and sodium silicate. In this embodiment, the ceramic particles comprise diatomaceous earth particles and kaolinite particles. The rheology modifier is sodium silicate.

The non-combustible coating may comprise between about 50 weight percent and 70 weight percent diatomaceous earth, between about 20 weight percent and about 30 weight percent kaolinite, and between about 10 weight percent and about 20 weight percent sodium silicate. For example, the non-combustible coating may comprise about 62 weight percent diatomaceous earth, about 23 weight percent kaolinite, and about 15 weight percent sodium silicate.

The non-combustible coating may comprise diatomaceous earth, clay minca, and sodium silicate. In this embodiment, the ceramic particles comprise diatomaceous earth particles and clay minca particles. The rheology modifier is sodium silicate.

The non-combustible coating may comprise between about 50 weight percent and 60 weight percent diatomaceous earth, between about 15 weight percent and about 25 weight percent clay minca, and between about 20 weight percent and about 30 weight percent sodium silicate. For example, the non-combustible coating may comprise about 55 weight percent diatomaceous earth, about 21 weight percent clay minca, and about 24 weight percent sodium silicate.

The wrapper may be any wrapper. The wrapper may be a heat-conducting, non-combustible wrapper.

The provision of a heat-conducting, non-combustible wrapper may advantageously allow heat generated during combustion of the heat source to be transferred by conduction to the aerosol-forming substrate downstream of the combustible heat source through the heat-conducting, non-combustible wrapper. This may advantageously help to achieve sufficiently high conductive heat transfer from the combustible heat source to the aerosol-forming substrate to produce an acceptable aerosol.

Suitable heat-conducting, non-combustible wrappers include, but are not limited to: metal foil wrappers such as, for example, aluminium foil wrappers, steel foil wrappers, iron foil wrappers and copper foil wrappers; metal alloy foil wrappers; graphite foil wrappers; and certain ceramic fibre wrappers.

The wrapper may have any thickness. The wrapper may have a thickness of between about 30 micrometres and about 200 micrometres. The wrapper may have a thickness of at least about 30 micrometres, at least about 50 micrometres, or at least about 75 micrometres.

The wrapper may have a thickness of no more than about 250 micrometres, no more than about 200 micrometres, or no more than bout 150 micrometres.

For example, the wrapper may have a thickness of between about 50 micrometres and about 200 micrometres, or between about 75 micrometres and about 150 micrometres. The wrapper coating may have a thickness of about 150 micrometres.

This may advantageously allow the wrapper to have a similar thickness to the non-combustible coating allowing the wrapper to be flush with the non-combustible coating. The thickness of the wrapper may be about the same as the thickness of the non-combustible coating.

As described above, the coating may be applied to the combustible heat source by applying a liquid pre-coating formulation. The pre-coating formulation comprises all of the components of the non-combustible coating. In addition, the pre-coating formulation may comprise a dispersion aid.

The dispersion aid may comprise at least one of water, polycarboxy ethers, citric acid, polycarboxylate (such as ViscoCrete), melamine sulfonate, naphthalene sulfonate, and lignin sulfonate.

The provision of a dispersion aid may advantageously prevent the ceramic particles from agglomerating, providing a homogenous suspension. This may advantageously lead to a homogenous non-combustible coating.

An example pre-coating formulation may comprise between about 15 weight percent and 25 weight percent diatomaceous earth, between about 3 weight percent and about 10 weight percent kaolinite, between about 5 weight percent and about 15 weight percent sodium silicate, and between about 60 weight percent and about 70 weight percent water. For example, the pre-coating formulation may comprise about 18 weight percent diatomaceous earth, about 7 weight percent kaolinite, about 12 weight percent sodium silicate, and about 63 percent water.

Aerosol generating articles according to the present invention comprise a combustible heat source for heating the aerosol-forming substrate. The combustible heat source is preferably a solid heat source, and may comprise any suitable combustible fuel including, but not limited to, carbon and carbon-based materials containing aluminium, magnesium, one or more carbides, one or more nitrides and combinations thereof. Typically, known solid combustible heat sources for heated smoking articles are carbon-based, that is they comprise carbon as a primary combustible material.

The combustible heat source may be a combustible carbonaceous heat source.

The combustible heat source is preferably a blind combustible heat source.

As used herein with reference to the invention, the term "blind" describes a heat source that does not comprise any airflow channels extending from the front end face to the rear end face of the combustible heat source. As used herein with reference to the invention, the term "blind" is also used to describe a combustible heat source including one or more channels extending from the front end face of the combustible heat source to the rear end face of the combustible heat source, wherein a combustible substantially air impermeable barrier between the rear end face of the combustible heat source and the aerosol-forming substrate barrier prevents air from being drawn along the length of the combustible heat source through the one or more channels.

The inclusion of one or more closed air passageways increases the surface area of the blind combustible heat source that is exposed to oxygen from the air and may advantageously facilitate ignition and sustained combustion of the blind combustible heat source.

Aerosol generating articles according to the invention comprising blind combustible heat sources comprise one or more air inlets downstream of the rear end face of the combustible heat source for drawing air into one or more airflow pathways through the aerosol generating article. Aerosol generating articles according to the invention comprising non-blind combustible heat sources may also comprise one or more air inlets downstream of the rear end face of the combustible heat source for drawing air into one or more airflow pathways through the aerosol generating article. Where the aerosol generating article comprises one or more air inlets downstream of the rear end face of the combustible heat source, the one or more air inlets may be in the downstream portion of the retaining wrap. Alternatively, the one or more air inlets downstream of the rear end face of the combustible heat source may be further downstream than the downstream end of the downstream portion of the retaining wrap.

In some embodiments, aerosol generating articles according to the invention comprising blind combustible heat sources comprise one or more air inlets located proximate to the downstream end of the aerosol-forming substrate.

In use, air drawn along the one or more airflow pathways of aerosol generating articles according to the invention comprising a blind combustible heat source does not pass through any airflow channels along the blind combustible heat source. The lack of any airflow channels through the blind combustible heat source advantageously substantially prevents or inhibits activation of combustion of the blind combustible heat source during puffing by a user. This substantially prevents or inhibits spikes in the temperature of the aerosol-forming substrate during puffing by a user. By preventing or inhibiting activation of combustion of the blind combustible heat source, and so preventing or inhibiting excess temperature increases in the aerosol-forming substrate, combustion or pyrolysis of the aerosol-forming substrate under intense puffing regimes may be advantageously avoided. In addition, the impact of a user's puffing regime on the composition of the mainstream aerosol may be advantageously minimised or reduced.

The inclusion of a blind combustible heat source may also advantageously substantially prevent or inhibit combustion and decomposition products and other materials formed during ignition and combustion of the blind combustible heat source from entering air drawn through aerosol generating articles according to the invention during use thereof. This is particularly advantageous where the blind combustible heat source comprises one or more additives to aid ignition or combustion of the blind combustible heat source.

In aerosol generating articles according to the invention comprising a blind combustible heat source, heat transfer from the blind combustible heat source to the aerosol-forming substrate occurs primarily by conduction. Heating of the aerosol-forming substrate by forced convection is minimised or reduced. This may advantageously help to minimise or reduce the impact of a user's puffing regime on the composition of the mainstream aerosol of articles according to the invention.

In certain embodiments of the invention, the combustible heat source comprises at least one longitudinal airflow channel, which provides one or more airflow pathways through the heat source. The term "airflow channel" is used herein to describe a channel extending along the length of the heat source through which air may be drawn through the aerosol generating article. Such heat sources including one or more longitudinal airflow channels are referred to herein as "non-blind" heat sources.

The diameter of the at least one longitudinal airflow channel may be between about 1.5 millimetres and about 3 millimetres, more preferably between about 2 millimetres and about 2.5 millimetres.

Preferably, the combustible heat source has a length of between about 7 millimetres and about 17 millimetres, more preferably of between about 7 millimetres and about 15 millimetres, most preferably of between about 7 millimetres and about 13 millimetres. In some embodiments, the combustible heat source has a length of about 9 millimetres.

Preferably, the combustible heat source has a diameter of between about 5 millimetres and about 9 millimetres, more preferably of between about 7 millimetres and about 8 millimetres.

As used herein with reference to the invention, the term "aerosol-forming substrate" is used to describe a substrate capable of releasing upon heating volatile compounds, which can form an aerosol. The aerosols generated from aerosol-forming substrates of aerosol generating articles according to the invention may be visible or invisible and may include vapours (for example, fine particles of substances, which are in a gaseous state, that are ordinarily liquid or solid at room temperature) as well as gases and liquid droplets of condensed vapours.

The aerosol-forming substrate may be a solid aerosol-forming substrate. Alternatively, the aerosol-forming substrate may comprise both solid and liquid components. The aerosol-forming substrate may comprise a tobacco-containing material containing volatile tobacco flavour compounds, which are released from the substrate upon heating. Alternatively, the aerosol-forming substrate may comprise a non-tobacco material. The aerosol-forming substrate may further comprise one or more aerosol formers. Examples of suitable aerosol formers include, but are not limited to, glycerine and propylene glycol.

The aerosol-forming substrate may be a rod comprising a tobacco-containing material.

If the aerosol-forming substrate is a solid aerosol-forming substrate, the solid aerosol-forming substrate may comprise, for example, one or more of: powder, granules, pellets, shreds, spaghetti strands, strips or sheets containing one or more of: herb leaf, tobacco leaf, fragments of tobacco ribs, reconstituted tobacco, homogenised tobacco, extruded tobacco and expanded tobacco. The solid aerosol-forming substrate may be in loose form, or may be provided in a suitable container or cartridge. For example, the aerosol-forming material of the solid aerosol-forming substrate may be contained within a paper or other wrapper and have the form of a plug. Where an aerosol-forming substrate is in the form of a plug, the entire plug including any wrapper is considered to be the aerosol-forming substrate.

The solid aerosol-forming substrate may contain additional tobacco or nontobacco volatile flavour compounds, to be released upon heating of the solid aerosol-forming substrate. The solid aerosol-forming substrate may also contain capsules that, for example, include the additional tobacco or non-tobacco volatile flavour compounds and such capsules may melt during heating of the solid aerosol-forming substrate.

The solid aerosol-forming substrate may be provided on or embedded in a thermally stable carrier. The carrier may take the form of powder, granules, pellets, shreds, spaghetti strands, strips or sheets. The solid aerosol-forming substrate may be deposited on the surface of the carrier in the form of, for example, a sheet, foam, gel or slurry. The solid aerosol-forming substrate may be deposited on the entire surface of the carrier, or alternatively, may be deposited in a pattern in order to provide a non-uniform flavour delivery during use.

The aerosol-forming substrate may be in the form of a plug or segment comprising a material capable of emitting volatile compounds in response to heating circumscribed by a paper or other wrapper. Where an aerosol-forming substrate is in the form of such a plug or segment, the entire plug or segment including any wrapper is considered to be the aerosol-forming substrate.

The aerosol-forming substrate preferably has a length of between about 5 millimetres and about 20 millimetres. In certain embodiments, the aerosol-forming substrate may have a length of between about 6 millimetres and about 15 millimetres or a length of between about 7 millimetres and about 12 millimetres.

The aerosol-forming substrate may comprise a plug of tobacco-based material wrapped in a plug wrap. In preferred embodiments, the aerosol-forming substrate comprises a plug of homogenised tobacco-based material wrapped in a plug wrap.

Aerosol generating articles according to the invention may comprise a transfer element, or spacer element, downstream of the aerosol-forming substrate. Such an element may take the form of a hollow tube that is located downstream of an aerosol-forming substrate.

The transfer element may abut one or both of the aerosol-forming substrate and a mouthpiece. Alternatively, the transfer element may be spaced apart from one or both of the aerosol-forming substrate and the mouthpiece.

The inclusion of a transfer element advantageously allows cooling of the aerosol generated by heat transfer from the combustible heat source to the aerosol-forming substrate. The inclusion of a transfer element also advantageously allows the overall length of the aerosol generating article to be adjusted to a desired value, for example to a length similar to that of a conventional cigarette, through an appropriate choice of the length of the transfer element.

The transfer element may have a length of between about 7 millimetres and about 50 millimetres, for example a length of between about 10 millimetres and about 45 millimetres or of between about 15 millimetres and about 30 millimetres. The transfer element may have other lengths depending upon the desired overall length of the aerosol generating article, and the presence and length of other components within the aerosol generating article.

Preferably, the transfer element comprises at least one open-ended tubular hollow body. In such embodiments, in use, air drawn into the aerosol generating article passes through the at least one open-ended tubular hollow body as it passes downstream through the aerosol generating article from the aerosol-forming substrate to the distal end of the aerosol generating article.

The transfer element may comprise at least one open-ended tubular hollow body formed from one or more suitable materials that are substantially thermally stable at the temperature of the aerosol generated by the transfer of heat from the combustible heat source to the aerosol-forming substrate. Suitable materials are known in the art and include, but are not limited to, paper, cardboard, plastics, such a cellulose acetate, ceramics and combinations thereof.

Aerosol generating articles according to the invention may comprise an aerosol-cooling element or heat exchanger downstream of the aerosol-forming substrate. The aerosol-cooling element may comprise a plurality of longitudinally extending channels. Where the aerosol generating article comprises a transfer element downstream of the aerosol-forming substrate, the aerosol-cooling element is preferably downstream of the transfer element.

The aerosol-cooling element may comprise a gathered sheet of material selected from the group consisting of metallic foil, polymeric material, and substantially non-porous paper or cardboard. In certain embodiments, the aerosol-cooling element may comprise a gathered sheet of material selected from the group consisting of polyethylene (PE), polypropylene (PP), polyvinylchloride (PVC), polyethylene terephthalate (PET), polylactic acid (PLA), cellulose acetate (CA), and aluminium foil.

In certain preferred embodiments, the aerosol-cooling element may comprise a gathered sheet of biodegradable polymeric material, such as polylactic acid (PLA) or a grade of Mater-Bi® (a commercially available family of starch based copolyesters).

Preferably, the aerosol generating article comprises a mouthpiece downstream of the aerosol-forming substrate and positioned at the downstream end of the aerosol generating article. The mouthpiece may comprise a filter. For example, the mouthpiece may comprise a filter plug having one or more segments. Where the mouthpiece comprises a filter plug, preferably the filter plug is a single segment filter plug. The filter plug may comprise one or more segments comprising cellulose acetate, paper or other suitable known filtration materials, or combinations thereof. Preferably, the filter plug comprises filtration material of low filtration efficiency.

Aerosol generating articles according to the present invention may comprise a plurality of elements assembled in the form of a rod.

The aerosol generating article may be substantially cylindrical in shape. The aerosol generating article may be substantially elongate. The aerosol-forming substrate may be substantially cylindrical in shape. The aerosol-forming substrate may be substantially elongate. The aerosol-forming substrate may be located in the aerosol generating article such that the length of the aerosol-forming substrate is substantially parallel to the airflow direction in the aerosol generating article.

The transfer section or element may be substantially elongate.

The aerosol generating article may have any desired length. For example, the aerosol generating article may have a total length of between approximately 65 millimetres and approximately 100 millimetres. The aerosol generating article may have any desired external diameter. For example, the aerosol generating article may have an external diameter of between approximately 5 millimetres and approximately 12 millimetres.

It should also be appreciated that particular combinations of the various features described and defined in any aspects of the invention can be implemented, supplied, or used independently.

Figure 1:
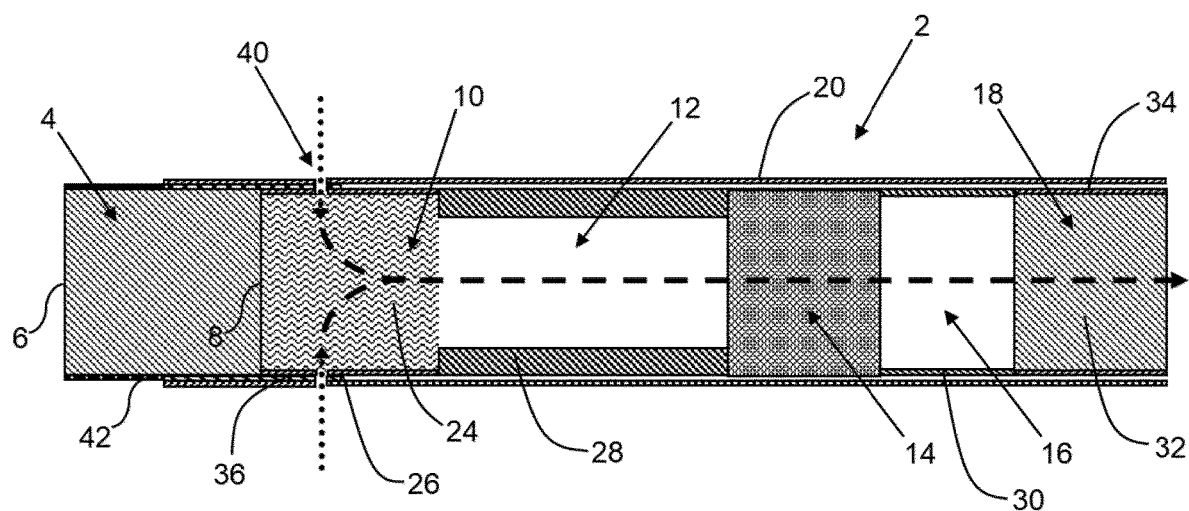
FIG. 1 shows a schematic longitudinal cross-sectional view of an aerosol generating article according to the present invention.

The aerosol-generating article 2 according to the first embodiment of the invention shown in FIG. 1 comprises a blind combustible heat source 4 having a front face 6 and an opposed rear face 8, and an aerosol-forming substrate 10 downstream of the combustible heat source 4. The aerosol generating article 2 further comprises a transfer element 12, an aerosol-cooling element 14, and a spacer element 16 disposed downstream of the aerosol-forming substrate 10.

The combustible heat source 4 is a blind carbonaceous combustible heat source and is located at the distal end of the aerosol-generating article 2. The combustible heat source 4 includes calcium peroxide as an ignition aid.

The aerosol-forming substrate 10 is located immediately downstream of the heat source 4. The aerosol-forming substrate 10 comprises a cylindrical plug of homogenised tobacco-based material 24 including an aerosol former such as, for example, glycerine, wrapped in plug wrap 26.

The transfer element 12 is located immediately downstream of the aerosol-forming substrate 10 and comprises a cylindrical open-ended hollow cellulose acetate tube 28.

The aerosol-cooling element 14 is located immediately downstream of the transfer element 12 and comprises a gathered sheet of biodegradable polymeric material such as, for example, polylactic acid.

The spacer element 16 is located immediately downstream of the aerosol-cooling element 14 and comprises a cylindrical open-ended hollow paper or cardboard tube 30.

The mouthpiece 18 is located immediately downstream of the spacer element 16. As shown in FIG. 1, the mouthpiece 18 is located at the proximal end of the aerosol-generating article 2 and comprises a cylindrical plug of suitable filtration material 32 such as, for example, cellulose acetate tow of very low filtration efficiency, wrapped in filter plug wrap 34.

A heat-conducting, combustion-resistant wrapper 36 circumscribes the upstream portion of the aerosol-forming substrate 10 and the downstream portion of the combustible heat source 4. The wrapper 36 comprises aluminium foil.

An outer wrapper 20 circumscribes at least a portion of each of the components of the aerosol generating article 2. The outer wrapper 20 is formed from paper.

As shown in FIG. 1, a circumferential arrangement of air inlets 40 is provided in the plug wrap 26 of the aerosol-forming substrate 10, the outer wrapper 20 and the heat-conducting, combustion-resistant wrapper 36 to admit cool air (shown by dotted arrows in FIG. 1) into the aerosol-forming substrate 10.

The aerosol-generating article 2 further comprises a non-combustible coating 42 provided on the upstream portion of the combustible heat source 4. The non-combustible coating 42 circumscribes the upstream portion of the combustible heat source 4. The non-combustible coating 42 is not provided on the front end face of the combustible heat source 4. The non-combustible coating 42 has a thickness of 150 micrometres and comprises ceramic particles having an average size of between about 0.04 micrometres and about 150 micrometres. The non-combustible coating 42 comprises diatomaceous earth, sodium silicate, and kaolinite.

In use, a user ignites the blind combustible heat source 4 of the aerosol-generating article 2 according to the first embodiment of the invention and then draws on the mouthpiece 18. When a user draws on the mouthpiece 18, air (shown by dotted arrows in FIG. 1) is drawn into the aerosol-forming substrate 10 of the aerosol-generating article 2 through the air inlets 40.

The front portion of the aerosol-forming substrate 10 is heated by conduction through the rear face 8 of the blind combustible heat source 4 and the heat-conducting, combustion-resistant wrapper 36.

The heating of the aerosol-forming substrate 10 by conduction releases glycerine and other volatile and semi-volatile compounds from the plug of homogenised tobacco-based material 24. The compounds released from the aerosol-forming substrate 10 form an aerosol that is entrained in the air drawn into the aerosol-forming substrate 10 of the aerosol-generating article 2 through the air inlets 40 as it flows through the aerosol-forming substrate 10. The drawn air and entrained aerosol (shown by dashed arrows in FIG. 1) pass downstream through the transfer element 12, aerosol-cooling element 14 and spacer element 16, where they cool and condense. The cooled drawn air and entrained aerosol pass downstream through the mouthpiece 18 and are delivered to the user through the proximal end of the aerosol-generating article 2 according to the first embodiment of the invention.

Figure 2:
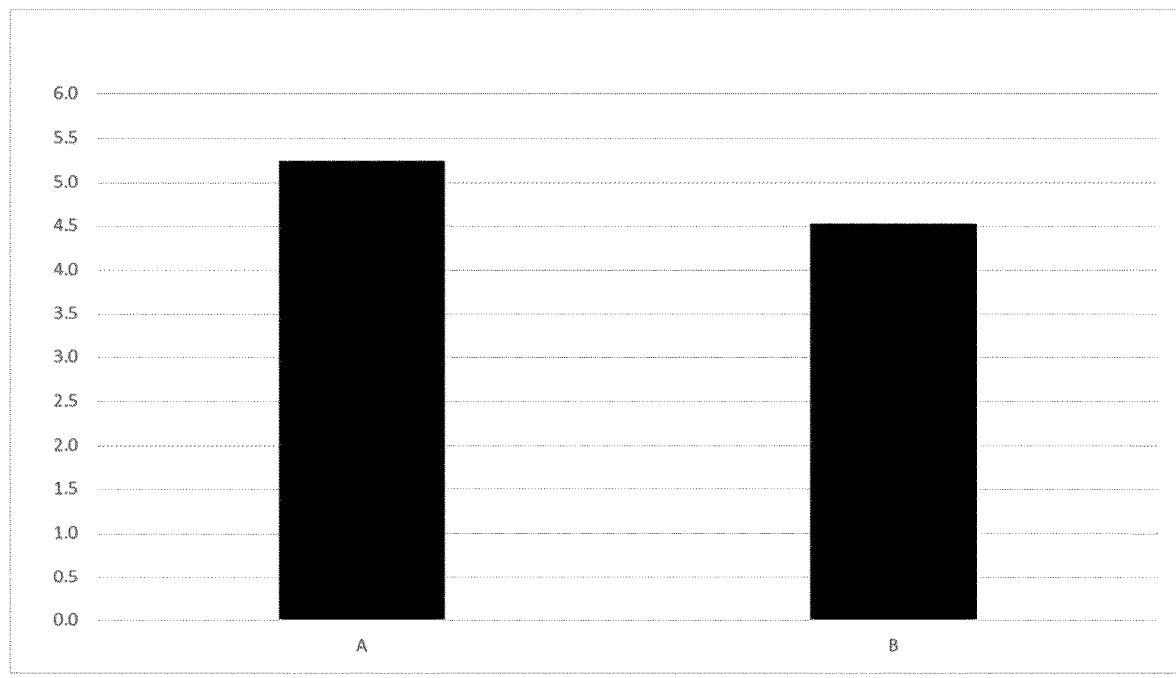
FIG. 2 shows the comparative ignition propensity values for a first aerosol generating article according to the present invention and a reference article.
Figure 4:
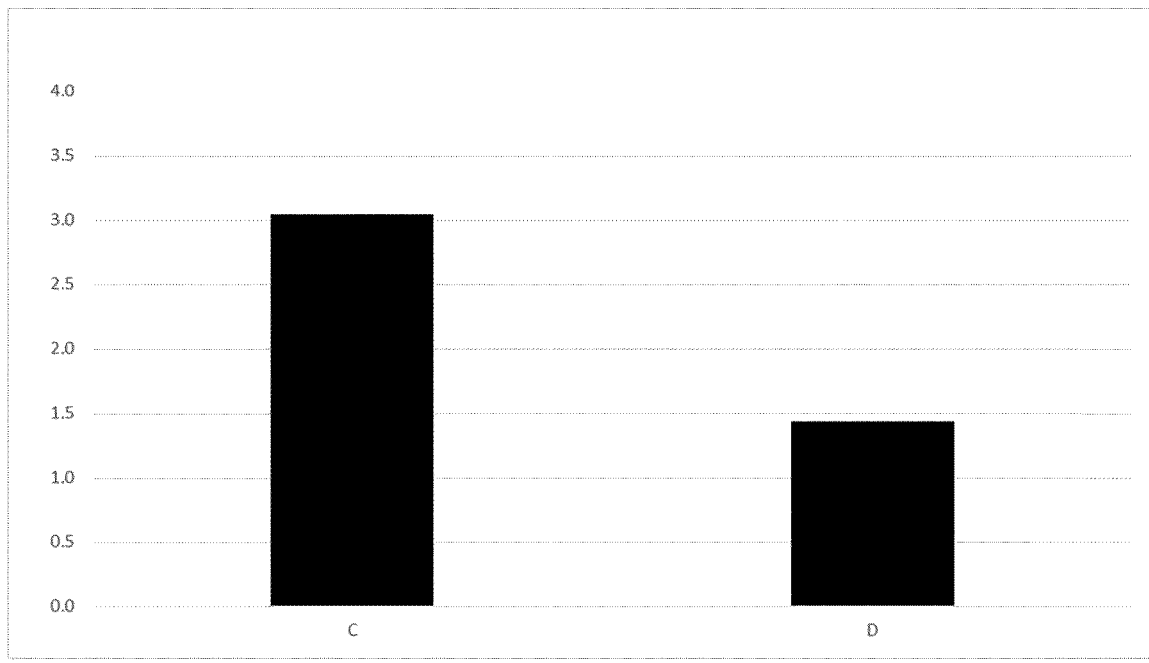
FIG. 4 shows the comparative ignition propensity values for a second aerosol generating article according to the present invention and a reference article.

FIGS. 2 and 4 show the results of ignition propensity tests for a first aerosol generating article according to the present invention, a second aerosol generating article according to the present invention, and a reference aerosol generating article. The thickness of the non-combustible coating of the first aerosol-generating article was about 50 micrometres. The thickness of the non-combustible coating of the second aerosol-generating article was about 150 micrometres. The reference aerosol generating article was identical to the first and second aerosol-generating articles but did not have any non-combustible coating provided on the upstream portion of the combustible heat source.

To perform the ignition propensity tests, the aerosol generating article to be tested was placed in a stick holder and the combustible heat source was ignited using a yellow flame lighter. After a predetermined period of time, the aerosol generating article was placed on a stack of 10 white filter pads. The aerosol generating article was left on the stack of filter pads for 8 minutes, after which the aerosol generating article was removed. Each of the 10 filter pads were then photographed using a microscope and a computer was used to analyse the total charred area across all 10 filter pads.

In both FIG. 2 and FIG. 4, the vertical axis shows the total charred area in units of 10 millimetres squared.

FIG. 2 shows the total charred area of the 10 filter pads for a reference aerosol generating article, labelled 'A', and a first aerosol generating article according to the present invention in which the thickness of the non-combustible coating was about 50 micrometres, labelled 'B'.

FIG. 4 shows the total charred area of the 10 filter pads for a reference aerosol generating article, labelled 'C', and a second aerosol generating article according to the present invention in which the thickness of the non-combustible coating was about 150 micrometres, labelled 'D'.

As can be seen, in both tests, the burnt area for the aerosol generating articles according to the invention was smaller than the burnt area of the reference aerosol generating articles. This indicates that the ignition propensity for the aerosol generating according to the present invention is advantageously lower than the ignition propensity of aerosol generating articles which do not include the non-combustible coating. It is also clear that the second aerosol generating article according to the invention with the thicker (150 micrometres) coating advantageously exhibited a lower ignition propensity values than the first aerosol generating article according to the invention with the thinner (50 micrometres) coating.

Figure 3:
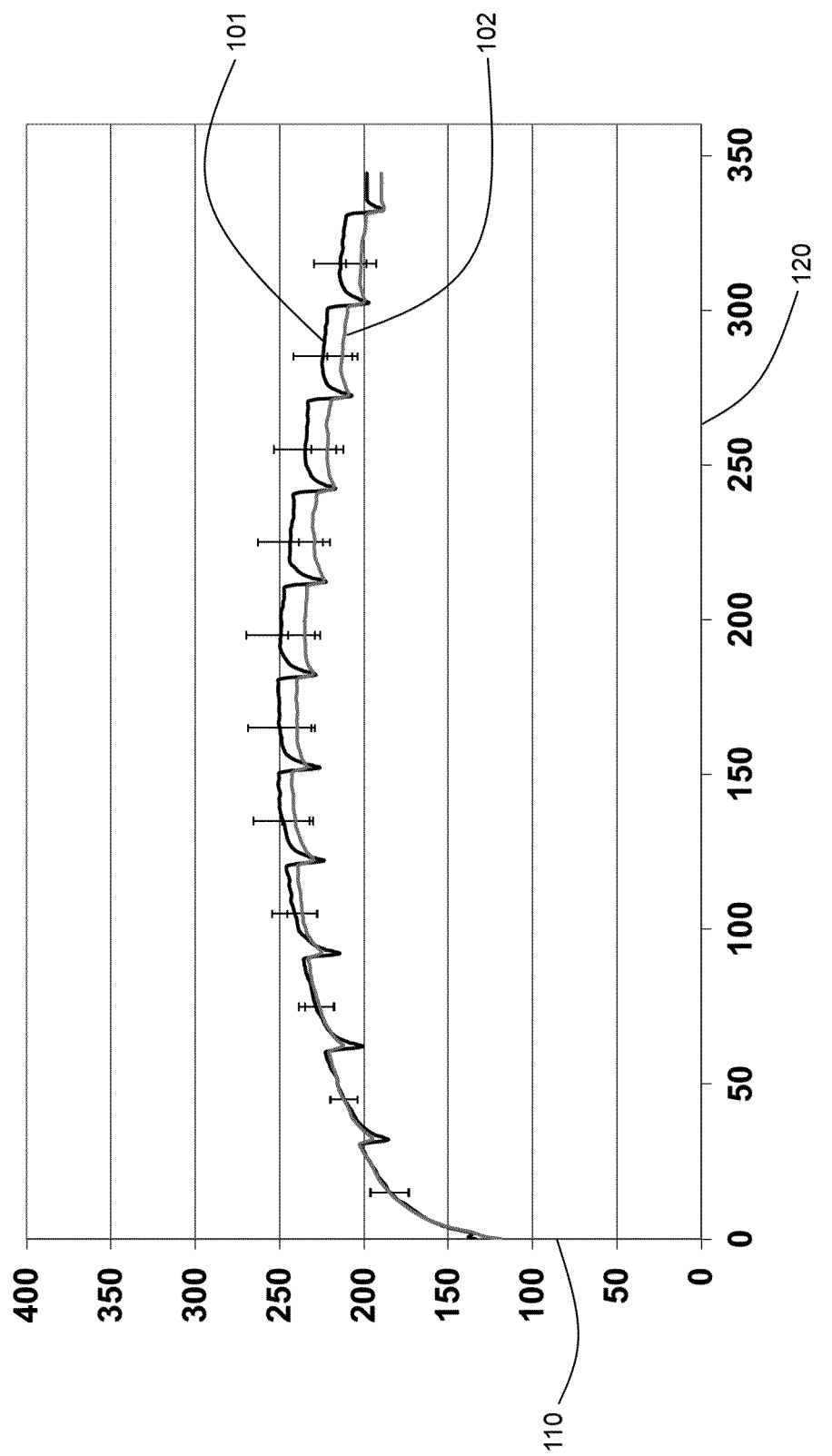
FIG. 3 shows the comparative temperature profiles for a first aerosol generating article according to the present invention and a reference article.
Figure 5:
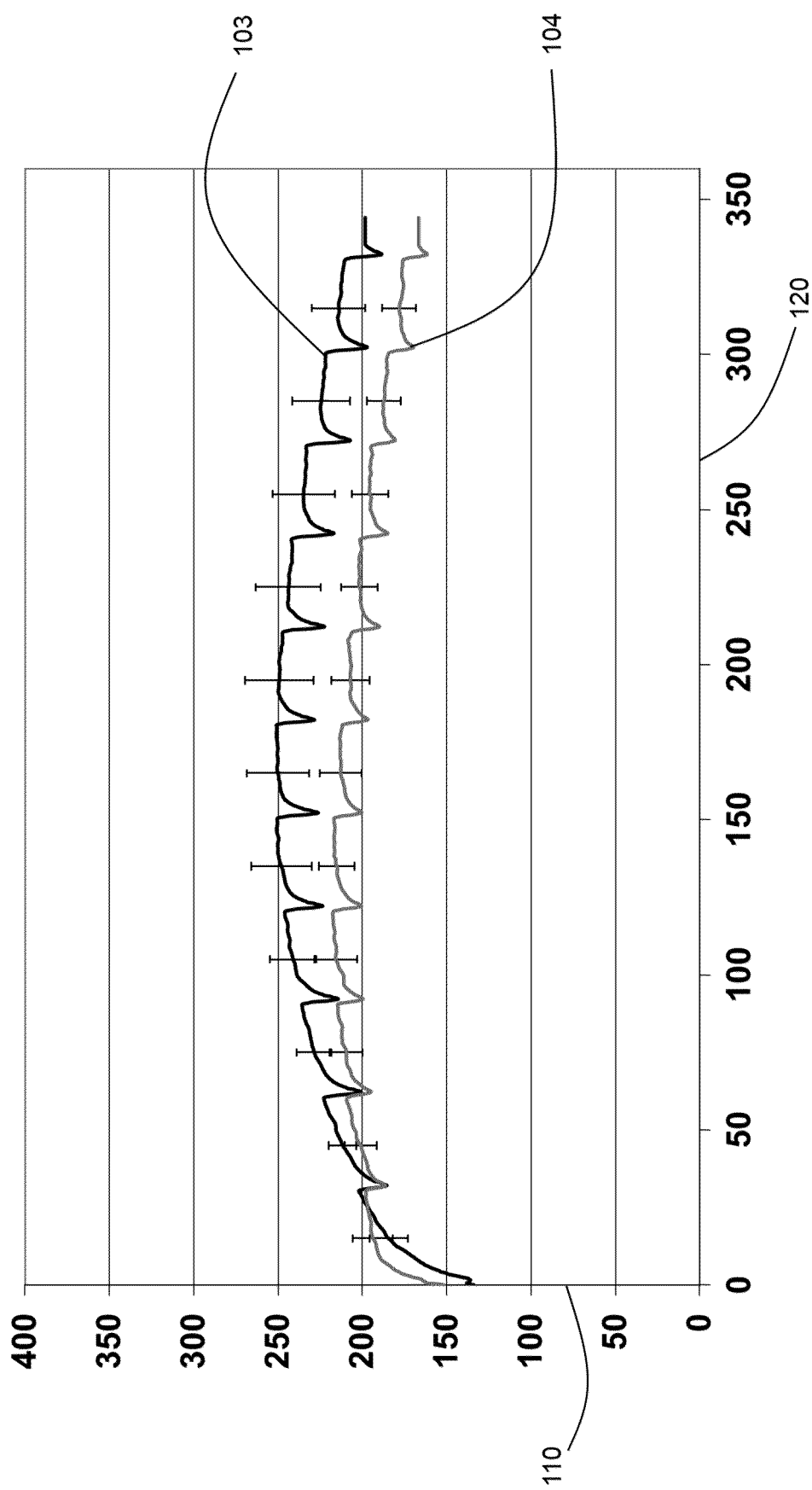
FIG. 5 shows the comparative temperature profiles for a second aerosol generating article according to the present invention and a reference article.

The first aerosol generating article, the second aerosol generating article, and reference aerosol generating article were connected to a smoking machine, the combustible heat sourced were ignited and the each aerosol generating article was subject to the same puff cycle. The temperature of tobacco plug, at 2 millimetres from the upstream end of the tobacco plug, was measured using a thermocouple throughout the puff cycle to produce temperature profiles showing the temperature of the tobacco plug as a function of time. These temperature profiles are shown in FIGS. 3 and 5. In the temperature profiles the temperature is shown on the vertical axis 110 and is in degrees Celsius, and time is shown on the horizontal axis 120 and is in seconds.

FIG. 3 shows the temperature profile for the first aerosol generating article according to the invention compared to that for the reference aerosol generating article. Line 101 (shown in black) is the temperature profile for a reference aerosol generating article. Line 102 (shown in grey) is the temperature profile for the first aerosol generating article according to the present invention in which the thickness of the non-combustible coating was about 50 micrometres. As can be seen, the temperature profile for the first aerosol generating article according to the invention is very similar to the temperature profile for the reference aerosol generating article. It is therefore apparent that the provision of a 50 micrometre thick non-combustible coating on the upstream portion of the combustible heat source does not have a detrimental effect on the performance of the aerosol generating article.

FIG. 5 shows the temperature profile for the second aerosol generating article according to the invention compared to that for the reference aerosol generating article. Line 103 (shown in black) is the temperature profile for a reference aerosol generating article. Line 104 (shown in grey) is the temperature profile for the second aerosol generating article according to the present invention in which the thickness of the non-combustible coating was about 150 micrometres. As can be seen, the temperature profile for the second aerosol generating article according to the invention is lower to than the temperature profile for the reference aerosol generating article. This indicates that the temperature of the aerosol-forming substrate of the second aerosol generating article according to the invention is lower than the temperature of the aerosol-forming substrate of the reference aerosol generating article. This may be associated with a lower performance. It is therefore apparent that the provision of a 150 micrometre thick non-combustible coating on the upstream portion of the combustible heat source may begin to reduce the performance of the aerosol generating article.

From these two tests, the inventors have surprisingly found that the optimal thickness for the non-combustible coating must be between about 50 micrometres and about 150 micrometres. As can be seen from the ignition propensity comparison of FIG. 2, where the non-combustible coating has a thickness of less than about 50 micrometres, the advantageous effect of reducing ignition propensity is likely to be negligible. However, as can be seen from the temperature profile comparison of FIG. 5, where the non-combustible coating has a thickens of more than about 150 micrometres, the performance of the aerosol generating article is likely to be negatively affected.

A test was also conducted to investigate the likelihood of observing the late boost phenomenon in aerosol generating articles according to the present invention. The second aerosol generating article according to the present invention and a reference aerosol generating article as described above were left un-covered at 22 degrees Celsius, 60 percent relative humidity for 144 hours and 180 hours. The combustible heat sources of the aerosol generating articles were then ignited and the combustion of the combustible heat sources were characterized. Twenty of each aerosol generating article were tested. Of the heat sources which exhibited a boost at all, the boost was characterised one of: "late boost"—combustion that stops and then restarts following ignition, "break"—at least some portion of the heat source breaks off due to extreme late boost, or "OK"—boost at start and correct propagation of the combustion with no late boost.

The results of these tests are shown below.

TABLE 1

|  | Late Boost (%) | Break (%) | OK (%) |
|---|---|---|---|
| Reference | 40 | 27 | 33 |
| 150 micrometre coated | 8 | 25 | 67 |

Table 1 shows the proportion of each type of boost after the aerosol generating articles have been left un-covered for 144 hours. As can be seen, the reference aerosol generating article exhibited significantly more instances of the late boost phenomenon compared to the second aerosol generating article according to the invention. Conversely, the second aerosol generating article according to the invention exhibited significantly more "OK" boosts compared to the reference aerosol generating article.

TABLE 2

|  | Late Boost (%) | Break (%) | OK (%) |
|---|---|---|---|
| Reference | 28 | 67 | 6 |
| 150 micrometre coated | 0 | 67 | 33 |

Table 2 shows the proportion of each type of boost after the aerosol generating articles have been left un-covered for 180 hours. As can be seen, the reference aerosol generating article exhibited significantly more instances of the late boost phenomenon compared to the second aerosol generating article according to the invention, which exhibited none. Conversely, the second aerosol generating article according to the invention exhibited significantly more "OK" boosts compared to the reference aerosol generating article.

Accordingly, the inventors of the present invention surprisingly found that the provision of a non-combustible coating according to the present invention was effective at reducing the late boost phenomenon.

The specific embodiments and examples described above illustrate but do not limit the invention. It is to be understood that other embodiments of the invention may be made and the specific embodiments and examples described herein are not exhaustive.

The invention claimed is:

1. An aerosol generating article comprising;
a combustible heat source having an upstream portion and a downstream portion,
an aerosol-forming substrate downstream of the heat source,
a wrapper circumscribing an upstream portion of the aerosol-forming substrate and the downstream portion of the combustible heat source, and
a non-combustible coating provided on the longitudinal outer surface of the upstream portion of the combustible heat source and not on the downstream portion of the combustible heat source, the non-combustible coating having a thickness of between about 30 micrometres and about 250 micrometres.

2. The aerosol generating article according to claim 1, wherein the combustible heat source comprises at least one ignition aid.

3. The aerosol generating article according to claim 2, wherein the at least one ignition aid comprises calcium peroxide.

4. The aerosol generating article according to claim 1, wherein the non-combustible coating is not provided on the front end face of the combustible heat source.

5. The aerosol generating article according to claim 1, wherein the non-combustible coating has a thickness of between about 50 micrometres and about 150 micrometres.

6. The aerosol generating article according to claim 1, wherein the non-combustible coating comprises ceramic particles.

7. The aerosol generating article according to claim 6, wherein the ceramic particles have a mean particle size of between about 0.04 micrometres and about 150 micrometres.

8. The aerosol generating article according to claim 6 or claim 7, wherein the ceramic particles comprise at least one of diatomaceous earth, expanded clay, vermiculite, pearlite, foam glass, kaolinite, and zirconia.

9. The aerosol generating article according to claim 1, wherein the non-combustible coating comprises at least one rheology modifier.

10. The aerosol generating article according to claim 9, wherein the rheology modifier comprises at least one of cellulose, cellulose derivatives, polyvinyl alcohol, polyethylene imine, polyethylene oxide, polyethylene glycol, xanthan gum, bentonite, microsilica, calcium carbonate, sodium silicate, and potassium silicates.

11. The aerosol generating article according to claim 1, wherein the non-combustible coating comprises diatomaceous earth, sodium silicate, and kaolinite.

12. The aerosol generating article according to claim 11, wherein the non-combustible coating comprises between about 50 weight percent and 70 weight percent diatomaceous earth, between about 20 weight percent and about 30 weight percent kaolinite, and between about 10 weight percent and about 20 weight percent sodium silicate.

13. The aerosol generating article according to claim 1, wherein the wrapper is a heat-conducting, combustion-resistant wrapper.

14. The aerosol generating article according to claim 1, herein the wrapper has a thickness of between about 30 micrometres and about 250 micrometres.

15. The aerosol generating article according to claim 1, wherein the non-combustible coating contains pores.

* * * * *